Figure 1:
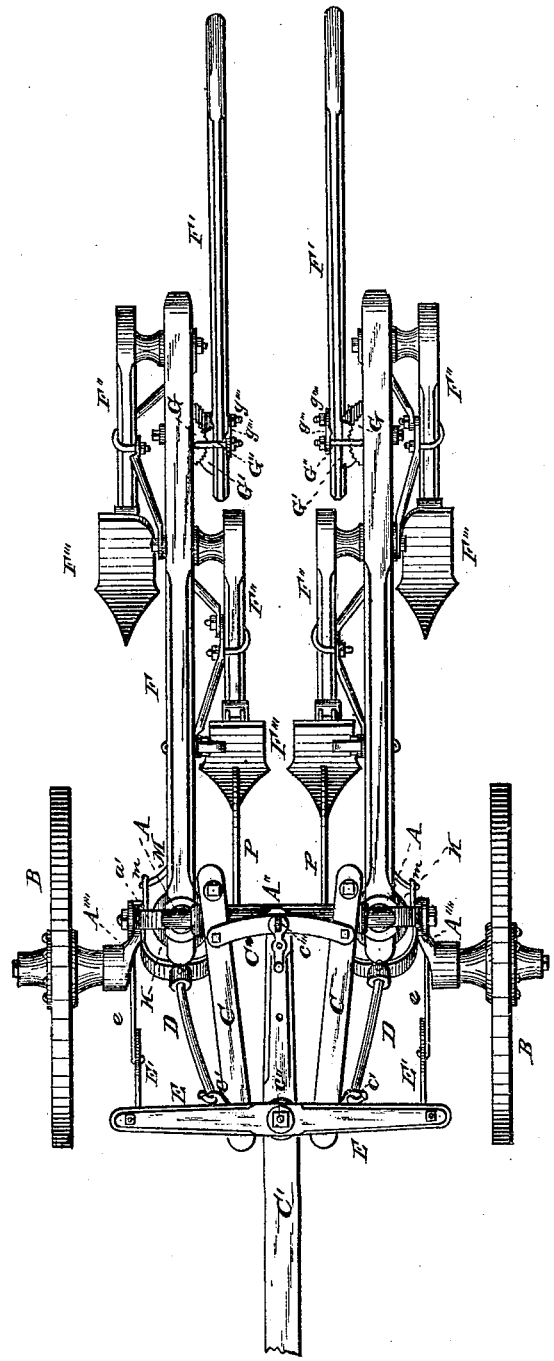

(Model.) 4 Sheets—Sheet 1.

G. W. BROWN & S. G. HOLYOKE.
CULTIVATOR.

No. 248,993. Patented Nov. 1, 1881.

Witnesses:
P. C. Dieterich.
Fred. G. Dieterich.

Inventors:
Geo. W. Brown
Samuel G. Holyoke
by W. B. Richards
Atty.

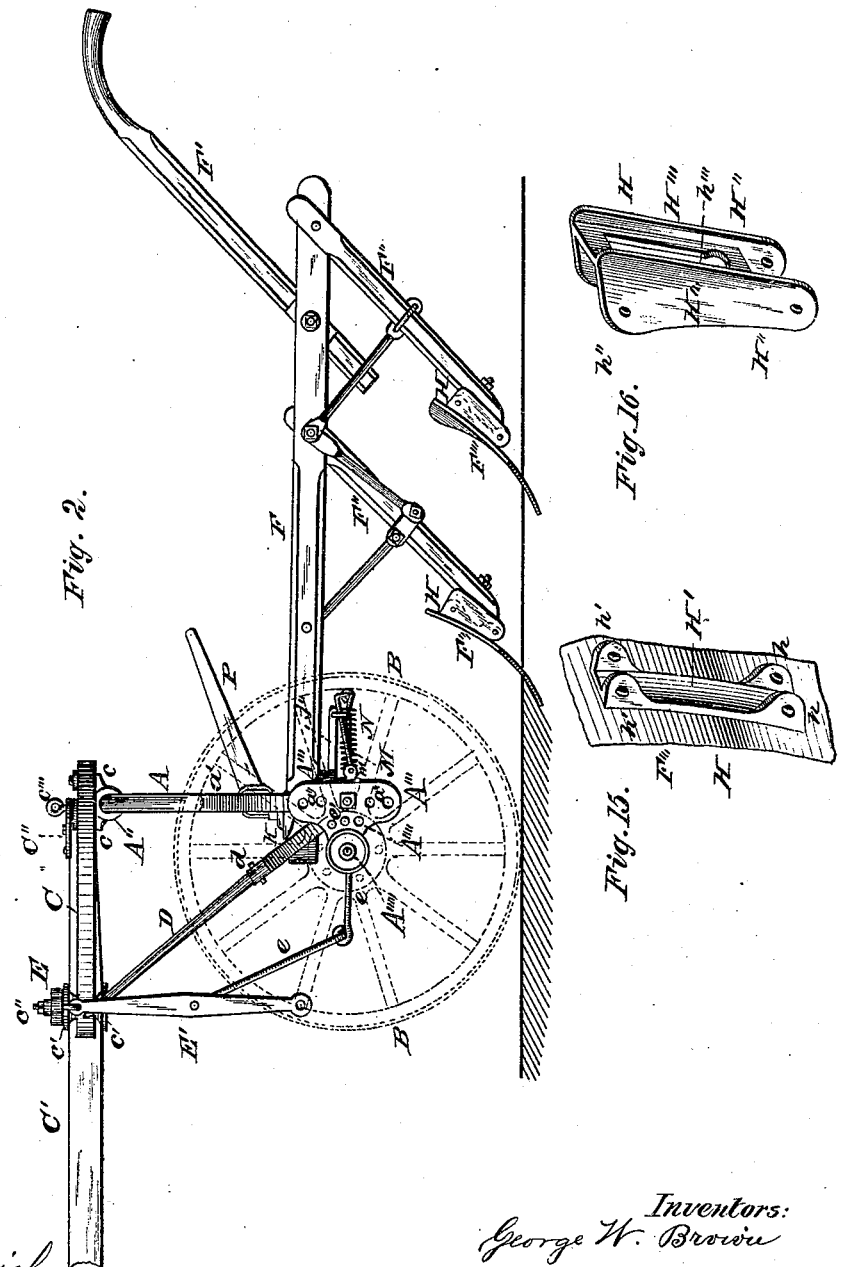

(Model.) 4 Sheets—Sheet 3.
G. W. BROWN & S. G. HOLYOKE.
CULTIVATOR.
No. 248,993. Patented Nov. 1, 1881.
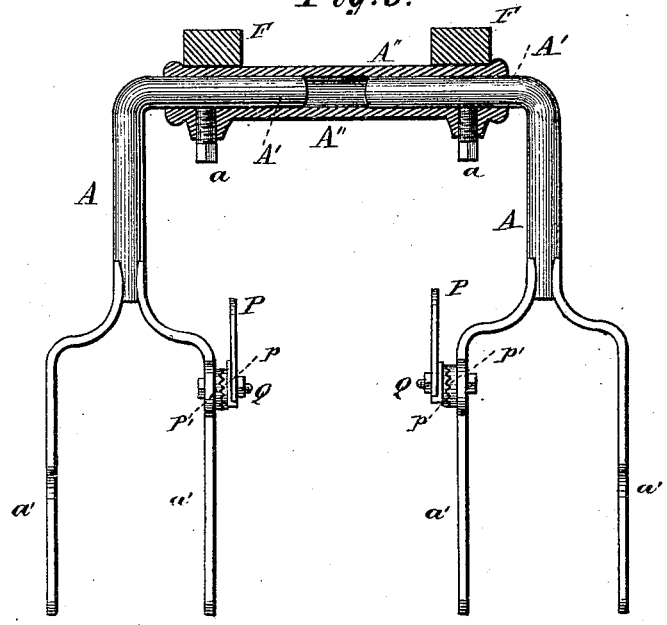
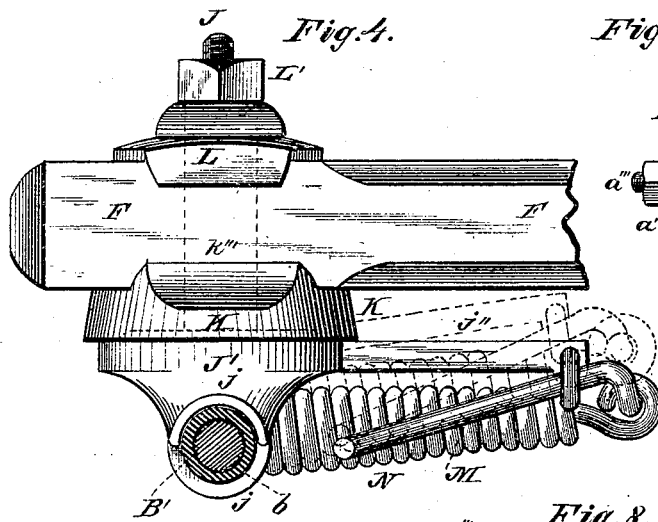
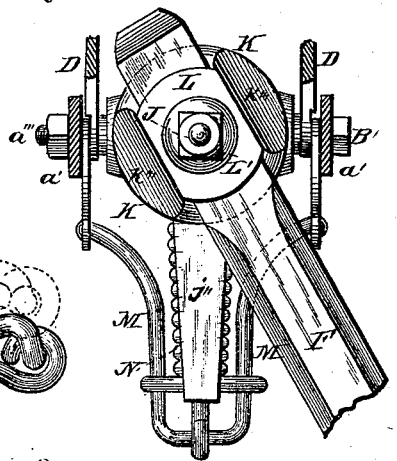
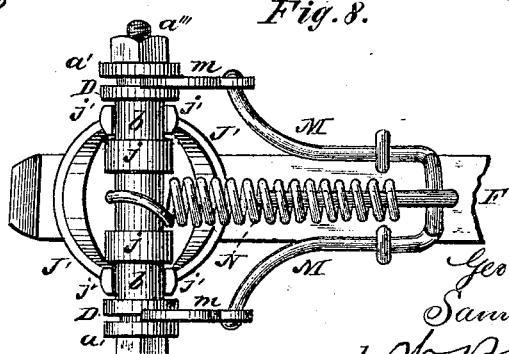
Witnesses:
P. C. Dieterich
Fred. G. Dieterich
Inventors:
Geo. W. Brown
Samuel G. Holyoke
by W. B. Richards
Atty.

(Model.)

4 Sheets—Sheet 4.

G. W. BROWN & S. G. HOLYOKE.
CULTIVATOR.

No. 248,993.

Patented Nov. 1, 1881.

Witnesses:
P. C. Dieterich
Fred. G. Dieterich

Inventors:
George W. Brown
Samuel G. Holyoke
by W. B. Richards
Atty.

UNITED STATES PATENT OFFICE.

GEORGE W. BROWN AND SAMUEL G. HOLYOKE, OF GALESBURG, ILLINOIS.

CULTIVATOR.

SPECIFICATION forming part of Letters Patent No. 248,993, dated November 1, 1881.

Application filed March 2, 1880. (Model.)

*To all whom it may concern:*

Be it known that we, GEORGE W. BROWN and SAMUEL G. HOLYOKE, of Galesburg, in the county of Knox and State of Illinois, have invented certain new and useful Improvements in Cultivators; and we do hereby declare that the following is a full, clear, and exact description of the invention, which will enable others skilled in the art to which it appertains to make and use the same, reference being had to the accompanying drawings, and to letters of reference marked thereon, which form a part of this specification.

Our invention relates to improvements in wheel-cultivators of the straddle-row class; and the objects of our improvements are, first, to provide a two-way joint for connecting the plow-beams to the axle, which shall relieve the bolt which retains the parts of the joint from the strain of the draft of the plows, and which shall have its surfaces of contact on which lateral movement of the plows is obtained so constructed that they will retain a lubricant, and which are connected to the plow-beams in a manner to protect the beams; second, to provide a spring which shall exert a downward pressure on the plows when in operation, and an upward or lifting force when the plows are raised above a working position, and which springs are connected with the parts of the joint, and of the axle in close proximity to the joint, and not with the plow-beam, and hence do not interfere with the movements of the plow-beams; third, to provide braces which do not require adjusting when the axle is adjusted to fix the distance between the plows; fourth, to provide practical and comparatively cheap means of securing a pivoted tongue to an axle; fifth, to provide means of preventing neck-draft of the tongue; sixth, to provide plow-handles which may be adjusted at different angles to the plow-beams, for the purpose of adjusting the rear ends of the handles transversely to the machine; seventh, to provide an attachment of the shovels to the standards, which provides means of removing the bolt by which the parts are attached to the standard without removing the shovel-block from the shovel, and which also provides for the use of a wooden "break-pin." We attain these objects by the mechanism illustrated in the accompanying drawings, in which the similar letters used as marks of reference apply to the like parts in all the figures.

Figure 6:
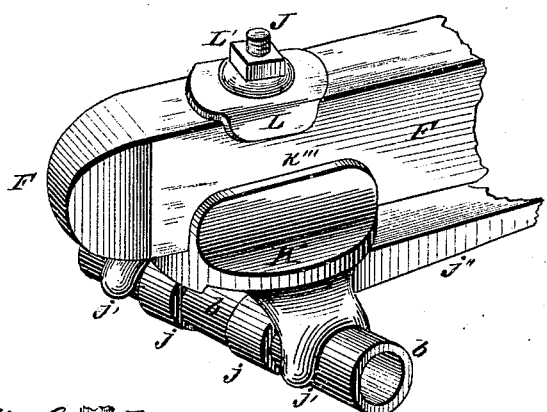
Figure 7:
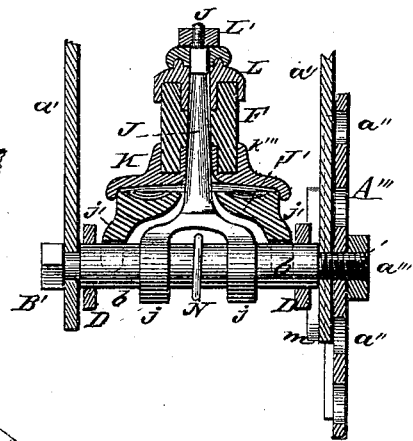
Figure 9:
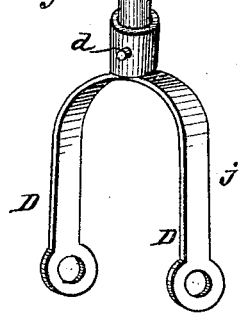
Figure 10:
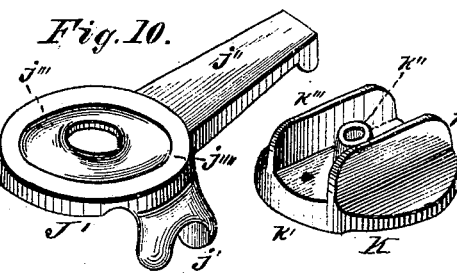
Figure 11:
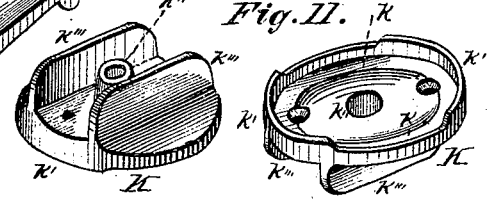
Figure 12:
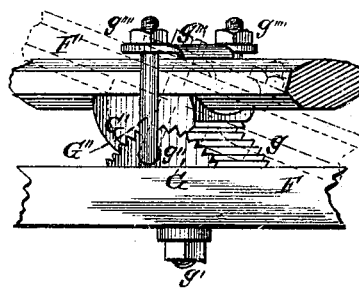
Figure 13:
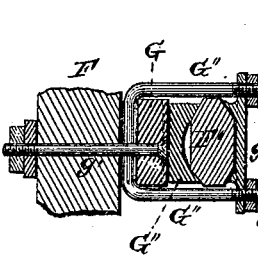
Figure 14:
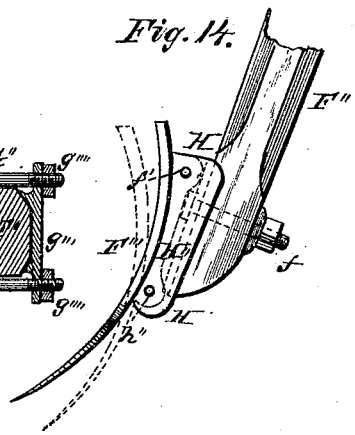

Figure 1 is a top plan of our improved cultivator. Fig. 2 is a side elevation, the near wheel removed and the farther wheel in dotted lines. Fig. 3 is a rear elevation of the axle alone. Fig. 4 is a side elevation, partly in section, showing the ends of the axle and plow-beam, their connecting-joint, and the spring. Fig. 5 is a plan, partly in section, of the end of the axle, the plow-beam shown turned to one side to show the spring. Fig. 6 is a perspective of the joint. Fig. 7 is a vertical sectional elevation of Fig. 6. Fig. 8 is a plan, seen from below, of the joint and spring. Figs. 9, 10, 11 are perspective views of the separate pieces of the joint. Fig. 12 is a top plan of the connection of a handle to the plow-beam. Fig. 13 is a sectional elevation in Fig. 12. Fig. 14 is a side elevation of one of the shovels and its attachment to the standard. Figs. 15, 16 are perspectives of the parts of the shovel-block separated. Figs. 4 to 16, inclusive, are enlarged.

A is the axle with vertical side parts, A', bent inward at their upper ends and inserted in a sleeve, A'', by which means the distance between the parts A' may be adjusted and retained after adjustment by the set-screws $a$ to adjust the distance between the plows. The lower ends of the parts A' are each forked into branches $a'$ $a'$, to each outer branch of which a plate, A''', with vertical series of holes $a''$, is fixed by a bolt, $a'''$. Each plate A''' has an arm, A'''', extending forward, from the front ends of which a stub-axle, A''''', projects laterally for a supporting-wheel, B. Each pair of branches $a'$ is connected by a bolt, B', surrounded by a sleeve, $b$. The outer end of the bolt B' projects, so that the plate A''' may be adjusted higher or lower on the branch $a'$ by securing the bolt B' in different holes, $a''$, and thus adjust the height of the front ends of the plow-beams as desired.

C C are bars, secured at their rear ends to lugs $c$, which project from the sleeve A'', and their front ends connected a short distance apart by upper and lower cross-bars, $c'$.

C' is the tongue, pivoted at $c''$ between the bars $c'$, so that it may be used as a pivot-tongue when desired, or may be made a stiff tongue by inserting the bolt $c'''$ through a hole in the rear end of the tongue and through a hole in a bar, C''.

D D are braces for the bars C, tongue and axle—their upper ends hooked into eyes on the ends of one of the cross-bars $c'$, and their lower ends forked and provided with eyes, through which the bolt B′ passes. Each brace D is made in two parts, connected by a joint, d, which permits of adjusting the distance between the vertical side of the axle without removing the braces D or loosening either of their ends.

E is the draft-equalizing bar, pivoted at its central part to the bars c′, and has pendent draft-rods E′ hinged or pivoted to its ends, to the lower ends of which the draft-animals may be attached, and from the central part of each of which a link, e, extends rearward, and may be engaged with either of a vertical series of holes, e′, in the front side of the plate A′′′. By engaging the links e in the higher holes e′ the draft of the team will tend to draw the front end of the tongue downward, and by engaging it with the lower holes the same draft will tend to elevate the front end of the tongue, and by this means the neck-draft, which varies in harder and softer soils, may be adjusted.

F F are the plow-beams, each with a handle, F′, standards F′′, and shovels F′′′.

G is a semicircular plate with corrugations g on its convex side, and bolted with its flat side to a plow-beam by a bolt, g′.

G′ is a plate with a corrugated concave side adapted to fit the convex side of the plate G, and is bolted with its flat side to the side of the plow-handle which is next the plow-beam.

G′′ is a stirrup, its central part preferably seated in a groove, g′′, in the flat side of the plate G, and its ends extending so as to embrace the plates G G′ and handle F′, and secured at their outer ends by a bridle-bar, g′′′, and nuts g′′′′. The plates G′ may be adjusted on the plates G to adjust the handles F′ laterally, as shown by dotted lines at Fig. 12, and when adjusted may be retained by the stirrup, bridle-bar, and nuts.

H is a shovel-block, formed in two parts, H′ H′′. The part H′ is riveted to the shovel in the ordinary manner, and has upturned ears h h at one end and similar ears, h′ h′, at its other end, as shown at Fig. 15. The part H′′ has upturned sides, H′′′. The parts H′ H′′ are hinged to each other by a bolt or rivet, h′′, which passes through the lower ends of the sides, H′′′, of one part and the ears h h of the other. The part H′′ has a slot, h′′′, in its back part, through which a bolt, f, passes to secure it to the lower end of a standard, F′′; and the lower end of the slot h′′′ is enlarged, as shown at Fig. 16, so that the block H can be removed from the standard without removing the bolt f, by loosening the nut thereon and raising the block H until the head of the bolt coincides with the enlarged end of the slot. A wooden pin, f′, may be inserted through holes h′′′′ in the upper end and sides of the part H′′ and coincident holes in the ears h′, which will break when the shovel strikes an obstruction that might break or bend any parts of the plow and allow the shovel to yield backward at its lower end, as shown by dotted lines at Fig. 14. The bolt f may be removed from the block H, as already described; or, by removing the pin f′, the parts H′ H′′ may be turned apart on the hinge h′′ and the bolt f then passed through the slot h′′′ head foremost. The slot h′′′ may be moved up and down on the bolt f to adjust the height of the shovel on the standard.

J is a bolt, the lower end of which is forked and has eyes j, which encircle the sleeve b.

J′ is a circular plate, with a central hole, through which the shank of the bolt J passes, and lugs j′ at its opposite sides, which lugs have semicircular grooves in their lower sides as bearing-surfaces where they rest on the sleeve b. The plate J′ has also an arm, j′′, projecting from its rear side, for purposes hereinafter described. The upper surface of the plate J′ has an annular depression, j′′′, as a reservoir for a lubricant, and exterior to the depression j′′′ is an annular bearing-surface, j′′′′, as shown at Fig. 10.

K is a circular plate, (see Fig. 11, which shows top and bottom views of it,) with a central hole for the bolt J, a bearing-surface, k, which acts on the bearing-surface j′′′′, an annular flange, k′, which extends downward exterior to the plate J′ on its lower side, and a boss or annular flange, k′′, projecting upward loosely around the bolt J, and side flanges, k′′′ k′′′, projecting upward and embracing the sides of the plow-beam on its upper side.

A plate, L, is fixed to the top of the beam F, through which plate the bolt J also passes, and a washer, L′, is placed above it with a square hole, through which a square part of the bolt J passes to prevent the washer from turning as the plow is moved laterally, and thereby prevent the nut which is immediately over the washer from becoming loosened. The parts of the joint are all securely held together by the single nut L′ and single bolt J, as shown at Figs. 6 and 7.

The eyes j and lugs j′ rotate on the sleeve b as a bearing when the rear ends of the plow-beams are raised or lowered, and the distance between the lugs j′ is such as to increase the efficiency of this part of the joint in holding the beams in upright positions. In moving the rear ends of the plows laterally the plate K turns on the plate J′, and the annular bearing-surfaces between them are of such great diameter as to increase the efficiency of this part of the joint in holding the plows in upright working positions.

The reservoir j′′′ may be supplied with any suitable lubricant to reduce the friction between the plates J′ and K, and the annular pendent flange k′ will prevent dirt getting into the joint.

The boss k′′ fits very loosely around the bolt J, and snugly in the plow-beam F, so that the draft on the plow-beam comes on the boss k′′ and plate K, and not on the bolt J; and the flange k′ on the plate K is drawn against the plate J′, as shown at Fig. 7, and thus further prevents the draft coming on the bolt J. Should the plow-beam shrink it will the firmer clasp the boss k′′, and should it swell it will the firmer fit the flanges k''', and thus under all conditions of ordinary swelling and shrinking of the beam it will be securely held to the plate K.

M is a U-shaped arm, with its outer middle portion bent slightly downward, and its ends bent outwardly and hinged or pivoted to eyes m m, which project rearward from the branches a' a'. The side portions near the outer end of the arm M pass loosely through hook-shaped eyes on the outer end of the arm j'', which extends rearward from the plate J'. A spiral spring, N, is attached at one end to the outer end of the arm M, and at its other end to the sleeve b, so that its tension constantly draws upon the outer end of the arm M. When the plow-beams are in working position, with their rear ends slightly below horizontal, the spring N, it will be seen at Figs. 2 and 4, will tend to draw the outer end of the arm j'' downward, and thereby exert a yielding downward force on the plows; but when the plows are raised above horizontal at their rear ends, as shown by dotted lines at Fig. 4, then the spring will tend to draw the outer end of the arm M upward, and thereby assist in raising the plows. The angle between the arm M and spring N increases as the rear end of the plow is raised to the position shown by dotted lines at Fig. 4, and hence the spring exerts an increasing force as the plow is raised, and thereby aids, where most required, in elevating the beams. The increased force exerted by the spring as the plow is elevated at its rear end is so great that when the plow is elevated sufficiently above the ground for local transportation, turning around, &c., the spring will hold the plow in such elevated position without other aid or support. In oscillating the plow-beams laterally the plate K turns upon the plate J', and the spring N, arms M and j'' are not moved, (see Fig. 5,) and hence do not in the least interfere with, and are not affected in any way by, the lateral movement of the plow-beams. The springs will operate the same when the plows are deflected laterally as when they are not.

P P are arms for suspending the plows in the ordinary manner. The arms P are attached to the vertical part of the axle by a bolt, Q, and the part which rests against the axle has radial corrugations p to correspond with radial corrugations p' on the adjacent part of the axle, as shown at Fig. 3, so that the arms P may be adjusted in radial positions on the bolt Q, to raise and lower their rear ends as desired.

The claims hereto annexed are not to be construed as broadly covering the feature of a spring which exerts an increased force as the plow-gangs are elevated, as such feature, broadly, is not our invention; but

What we claim as new, and desire to secure by Letters Patent, is—

1. In a cultivator-coupling, the plate J', provided with lugs which rest on the sleeve or journal, and with an upper bearing-surface, in combination with the bolt J and plate K, secured to the plow-beam and provided with an annular flange which extends downward around the plate J', so as to bear the draft of the plow, substantially as and for the purpose specified.

2. In a cultivator, the combination, with an axle or frame and plows hinged thereto, so as to have both vertical and lateral movement, of a spring, N, and arm M, adapted to move with the plow-beams when moved vertically and to exert a lifting force on the plow, substantially as and for the purpose specified.

3. The spring N, attached to the journal, on which the plows have vertical motion at one end, and to an oscillating arm, M, at the other end, in combination with the plow-beam and the axle of a cultivator, substantially as and for the purpose specified.

4. The spring N and oscillating arm M, arranged substantially as described, in combination with the arm j'', extending rearward from the plate J', and with the plow and axle, substantially as and for the purpose specified.

5. In combination with the coupling of a cultivator, a spring, N, attached to an oscillating arm, M, which has a sliding connection with an arm, j'', projecting from one of the coupling-pieces, substantially as and for the purpose specified.

6. In combination with the axle adjustable by means of the sleeve and set-screws, as described, and with the bars C C and tongue C', the braces D, having a joint, d, substantially as and for the purpose specified.

7. In combination with the axle having arms A'''', with series of adjusting-holes, and extending forward of the vertical parts of the axle, and provided with wheel-journals A''''' at their forward ends, the draft-links e, connected at their front ends with the draft-rods, and at their rear ends in the series of holes e', so that the draft of the team may be made to balance the parts and relieve neck-draft from the tongue, substantially as and for the purpose specified.

8. In combination with the plow-beam and handle, the plate G, secured to the plow-beam, and the plate G', secured to the handle, and having convex and concave faces, respectively, and the stirrup G'', substantially as and for the purpose specified.

9. The shovel-block H, constructed in two parts, H' H'', hinged to each other, in combination with the shovel and standard, the part H'', provided with a slot, h''', having an enlarged end for the reception of the bolt f, and the removal of the shovel-block without removing the bolt, substantially as and for the purpose specified.

In testimony that we claim the foregoing as our own we affix our signatures in presence of two witnesses.

GEORGE W. BROWN.
SAMUEL G. HOLYOKE.

Witnesses:
I. S. PERKINS,
JAS. E. BROWN.